(No Model.) 4 Sheets—Sheet 3.

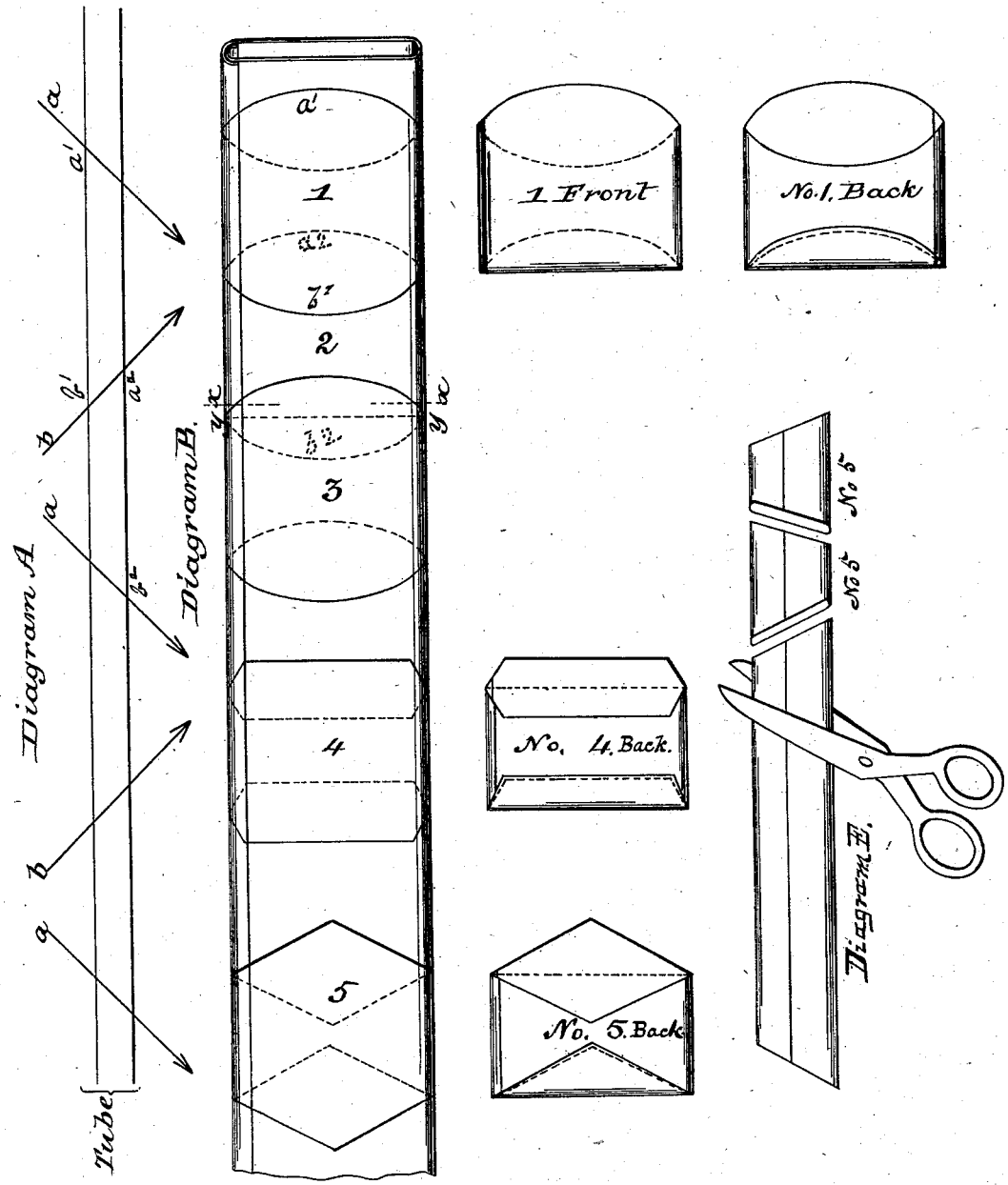

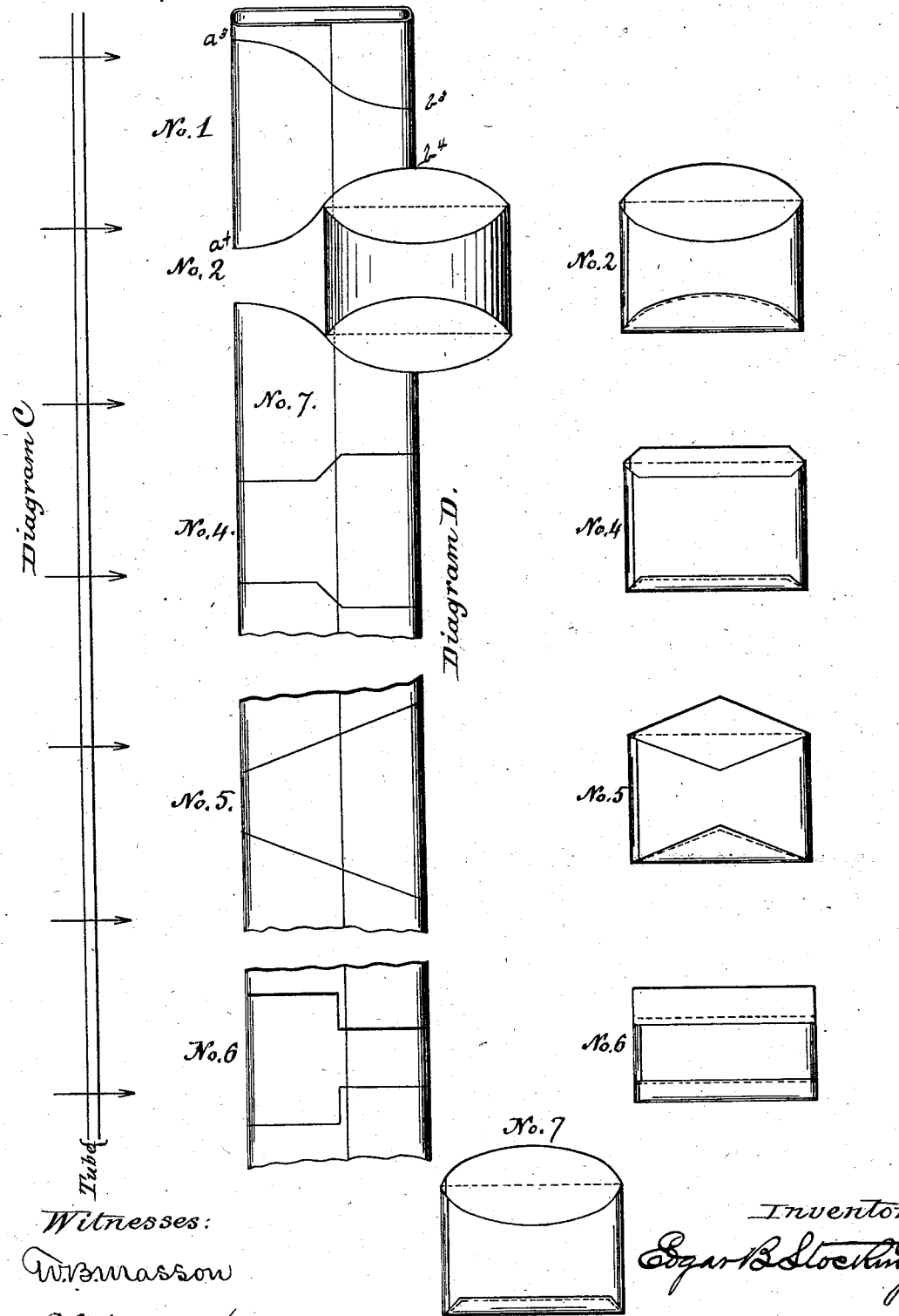

E. B. STOCKING.
MANUFACTURE OF ENVELOPES.

No. 259,238. Patented June 6, 1882.

Witnesses:
W. B. Masson
E. E. Masson

Inventor
Edgar B. Stocking (No Model.) 4 Sheets—Sheet 4.
E. B. STOCKING.
MANUFACTURE OF ENVELOPES.
No. 259,238. Patented June 6, 1882.
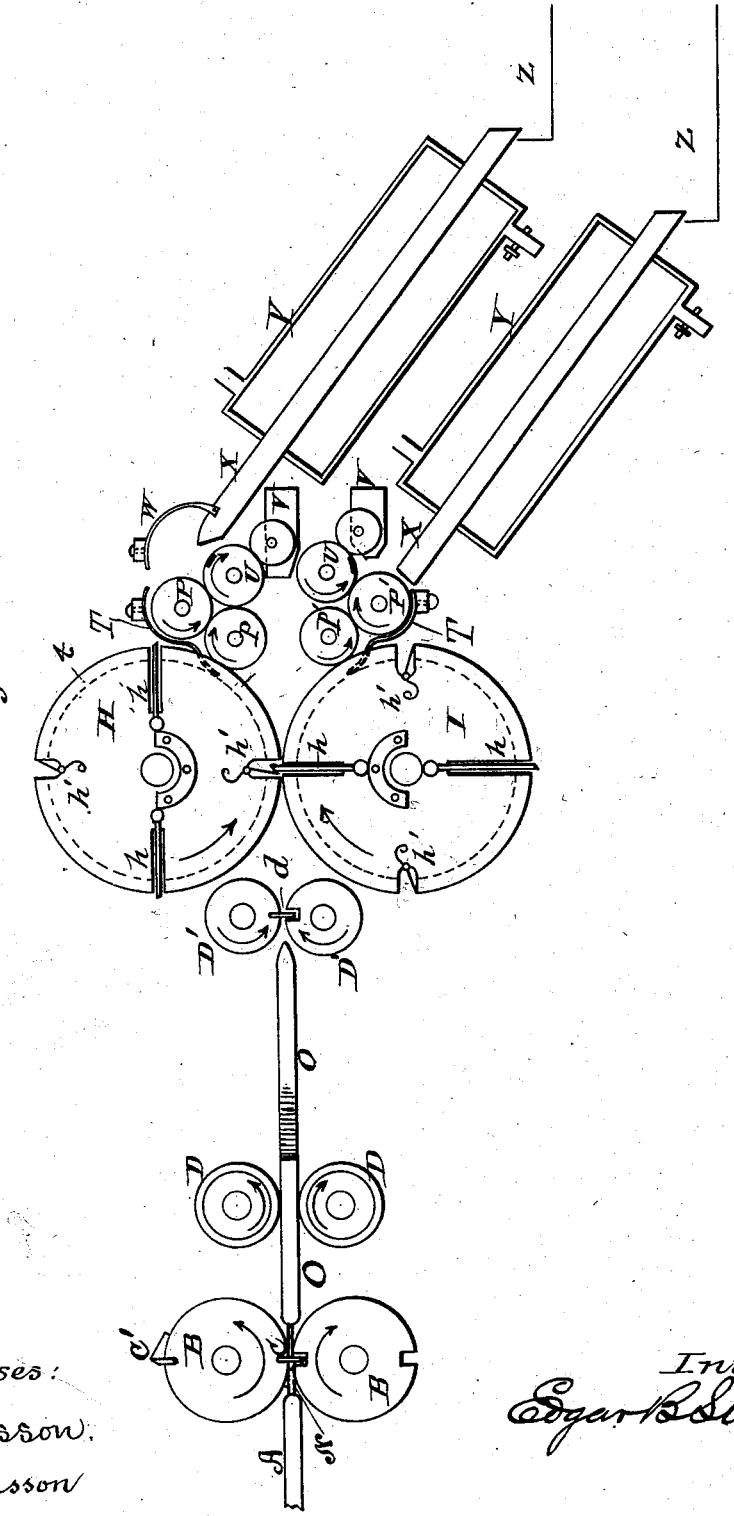

UNITED STATES PATENT OFFICE.

EDGAR B. STOCKING, OF WASHINGTON, DISTRICT OF COLUMBIA.

MANUFACTURE OF ENVELOPES.

SPECIFICATION forming part of Letters Patent No. 259,238, dated June 6, 1882.

Application filed October 17, 1881. (No model.)

*To all whom it may concern:*

Be it known that I, EDGAR B. STOCKING, a citizen of the United States of America, residing at Washington, in the District of Columbia, have invented certain new and useful Improvements in the Manufacture of Envelopes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
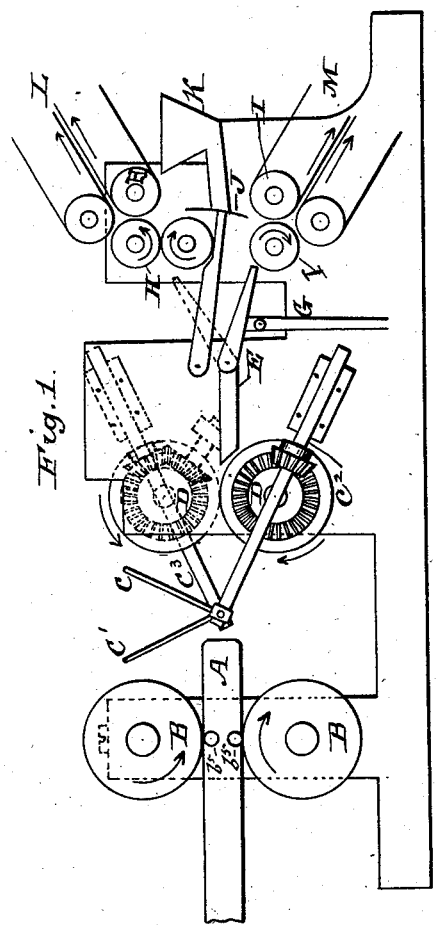
Figure 2:
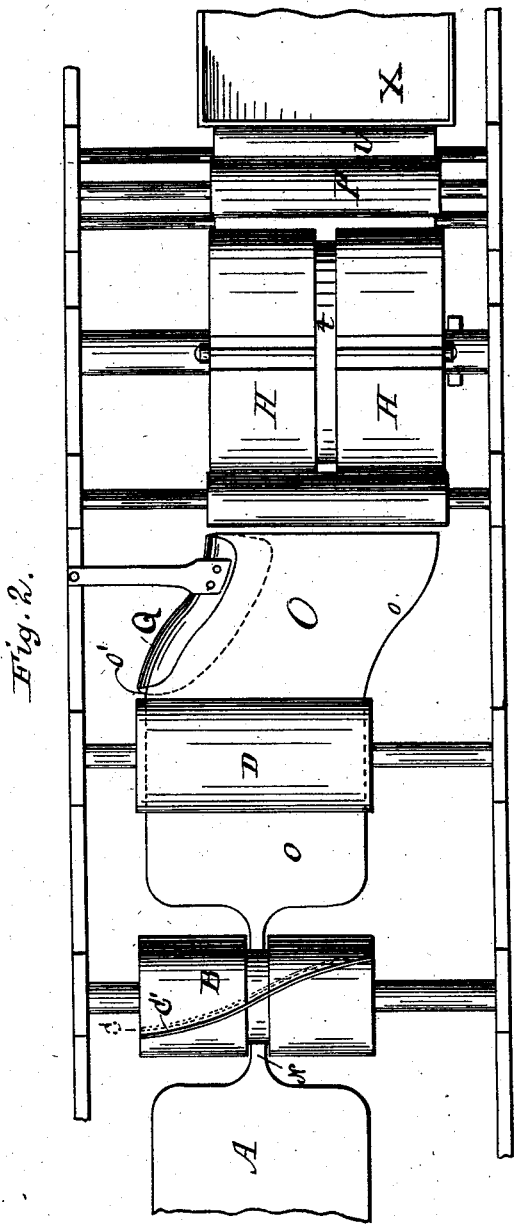

Of the drawings, Sheets 1 and 2, by Diagrams A, B, C, D, and E and their adjacent figures, Nos. 1, 2, 3, 4, 5, 6, and 7, illustrate my method of making envelopes, as hereinafter described. Sheet 3, Fig. 1, is a side elevation of the principal elements of one form of mechanism for the practice, by machinery, of my said method; and Fig. 2 is a plan in part; and Fig. 3, Sheet 4, a side elevation of another form or modification of machinery in its essential elements for practicing my said method.

My invention relates to the manufacture of envelopes, and has for its object a method of and means for their manufacture without waste of material and with accuracy and uniformity in the finished product and a greatly-increased rate of production.

Heretofore and at the present time the means employed in the manufacture of envelopes have been and are largely, if not entirely, limited in practice to the well-known reciprocating plunger or former to shape and assist in folding blanks, which are separately cut from the material in various ways with a view to reduce to the minimum the amount of material wasted; and I am not aware of any method hitherto devised of cutting the material into blanks of suitable shape for desirable styles of envelopes in which there is not some waste; and I am not aware of any rotary mechanism hitherto devised for the manufacture of envelopes from a web of material that does not waste more material than the above-mentioned means and methods of cutting and folding separate blanks; and, further, in all instances where rotary mechanism has been employed it has, so far as my knowledge of the art extends, involved the principle of operation or method of manufacture which consists in cutting from a continuous sheet or web in single thickness successive blanks, the terminating lines of which actually or nearly coincide at their ends, while at their sides strips of waste (continuous or detached) occur.

By my method I am enabled to manufacture envelopes with absolutely no waste, and by the use of my means for practicing my method an increased rate of production is accomplished, consequent upon and in comparison with the increased speed which rotary mechanism possesses in practice over reciprocatory mechanism, and accuracy and uniformity in the finished product are secured.

My method consists in forming the web or continuous sheet of material from which the envelopes are to be made into a tube, and cutting said tube into blanks adapted without further cutting to be folded into envelopes. The above cutting is of such a character that the blanks so separated from the tubular material have projecting flaps on each end of one ply thereof—the effect of cutting the tube in transverse-converging or oppositely-disposed straight, angular, or curved lines. After this method has been practiced the blanks may be folded, by hand or otherwise, to form envelopes.

I have used the expression "transverse-converging or oppositely-disposed lines," and I desire to define what I mean by that expression. Lines when "oppositely disposed," as I use the terms, cannot be parallel to each other. They converge. Curved and angular lines of like contour may be parallel to each other only when they are not oppositely disposed. Straight lines, when arranged with reference to a base-line in any other relation than a right angle to it, and when oppositely disposed, are not parallel, but converging. Hence cutting a tube of paper in or on successive transverse-converging or oppositely-disposed lines—for instance, with lines converging laterally—that is, arranged at other than a right angle to the edge of the tube—is to separate it into pieces or shorter tubes having slanting ends and opposite sides of unequal length, the short side of one piece following the long side of the next at each edge of the tube in the series produced, and when said lines are converging vertically—that is, arranged at other than a right angle to the top or bottom surface of the tube—is to separate it into pieces or shorter tubes having straight edges of equal length and oppositely-disposed end outlines of such contour that the shorter side of one tube in the series produced follows the longer side of the next. So with reference to the knives used. They are oppositely disposed when arranged to cut on oppositely-disposed lines. These ( ) are oppositely-disposed lines. These (( are not.

Cutting a tube on converging or oppositely-disposed lines produces envelope-blanks. The manner of cutting the tube into the above-specified blanks consists in severing it transversely in slanting directions, each alternate cut slanting in the same direction—that is, each successive cut being slanted in opposite direction—the plies of the tube being separated or held apart, or severing it transversely in a direction at a right angle, substantially, to its surface in lines which curve or have angles oppositely disposed, the plies of the tube being not separated—that is, lying one against the other—the effect being in both cases the production of tubular blanks having projecting flaps on each end of one ply thereof. The angle of the slant of the cut and the prominence of the curvature or angles of the cutting lines determine how deep the flaps shall be—that is, how far they shall project from the body portion of the blank and how low the "cut" or curvature of the back of the envelope shall be. The distance that the plies are separated when the vertically-slanting cut is made affects the outline produced in that, if widely separated, the flaps are increased in depth and may be even pointed while if closely pressed together no practical projection of the flaps is produced. Hence flaps of different depths may be produced, so that they may (when folded on the line $y$, Diagram B, which is the usual folding-line of ordinary envelopes—that is, the line where the face merges into the flap) either extend just enough to lap upon and be gummed to the back of the envelope, or extend sufficiently to make a double or treble thick back for strength; or they may be made so that it is necessary to locate the fold-line at such a point as to include a portion of the body, face, and back of the envelope, such line being indicated herein at $x$, Diagram B, these variations being produced by varying the direction of the cuts. So far as the location of the fold-line—that is, either at $x$ or at $y$, Diagram B—is concerned, it is a common practice to locate it at one or the other, and it is also common to produce extra-thick backs by overlapping the flaps. Hence these common styles of envelopes may be made according to and by the employment of my method. The cutting may be a single complete severance, or separate partial independent cuts made simultaneously or in succession.

The location of the seam of the tube and its location in the finished product is a matter permitting variation. It may in the tube be formed at one or the other edge, the lap of the seam constituting in the envelope an end edge of two thicknesses of material; or it may be formed in the tube at one edge and on one or the other ply of the tube, constituting, when completed, an envelope having a seam in its back or front and at one end thereof, and not at its edge, as above described. Furthermore, the seam of the tube may be formed in the longitudinal center of one or the other of the plies thereof, and in the completed envelope said seam may appear in any of the following locations, as the blanks may be folded or manipulated after being cut from the tube so made— that is to say, the seam may be located at the center of the back of the envelope, at the center of the front, at an end, back, or front, and a little one side of the center of the back of the envelope. These changes in the cutting and in the location of the seam of the tube involve another step in my method, which may or may not, as desired, be practiced, the object being to locate the seam in the envelope at desired points and to avoid the occurrence of a seam in the face of the envelope. This step consists in "turning" the blank. By the expression "turning" I mean to flatten the edges or turn the blank so as to locate what are its edges at its center, and vice versa. Hence a central seam in the tube may become the side seam in the envelope, or by not turning it so far it may be located at a little one side of the center of the back of the envelope. A seam in the center of the face of the envelope occurs when the seam of the tube is formed centrally, and this arises from the fact that in such a tube the slanting of the direct single cuts in successive opposite directions, and cutting in successive oppositely-disposed transverse lines a tube having an edge seam on one ply only, produce respectively projecting flaps first on the upper ply and then on the lower ply in continuous alternation, and projecting flaps on alternate edges of the tube, every other envelope having a seam in its front, and these latter, when turned, resemble the former in that it is necessary to fold the successive blanks in opposite directions to complete the envelopes; but this necessity may be avoided by turning the blanks in opposite directions, as described hereinafter.

Referring to the drawings, Diagram A, Sheet 1, represents in section a tube of paper the plies of which are separated. The arrows $a\ b$ represent the slant or direction in which the successive cuts are made. The slanted cuts are made transversely at a right angle to the longitudinal edges of the tube and entirely through both plies thereof.

Diagram B represents the tube in plan, the seam being at its edge, the solid transverse lines representing the cut in the upper ply and the dotted lines the cut in the lower ply, these cuts being produced after the method illustrated in Diagram A. The first two cuts at the right end of Diagram A produce the projecting flaps $a'$ $b'$, respectively, of blank No. 1 on the upper ply, which, when the flap $b'$ is folded, produces the envelope No. 1, front and back, as shown in the adjacent figures, while the blank produced by the next cut has its projecting flaps $a^2$ $b^2$ upon the lower ply and its back uppermost, when by folding its bottom flap in the opposite direction to that in which No. 1 was folded No. 2 is produced in the condition represented by "No. 1 back" of said adjacent figures, while No. 3 is produced with its flaps and face uppermost, as was No. 1.

Referring to Diagram C, which represents in section the web formed into a tube, the plies of which are close together, and to Diagrams D and E, which are a plan and perspective respectively, of the same tube, it is seen that projecting flaps may be made without slanting the cut, as above described—that is, vertically or separating the plies of the tube. In this case the cut is made directly at a right angle to the surface of the tube, and, as in the previous case, completely across and entirely through both plies thereof; but the knife or knives employed are so shaped as to cut on the lines shown. For instance, No. 1 of Diagram B is produced by a knife or knives cutting through both plies on the lines shown at No. 1 and at No. 2, Diagram D. No. 4, Diagram B, is produced by cutting on the lines shown at No. 4, Diagram D, while No. 5 requires simply a diagonal cut, (see Diagram E,) and with a slight modification of the cut No. 4 No. 6 is produced, and by alternating cuts Nos. 1 and 4 No. 7 is produced. It will be observed, however, that, instead of vertical cuts slanted in opposite direction to each other, as illustrated at Diagrams A and B, in this instance the curvature of the knives and the lines upon which they cut are disposed in opposite directions. Thus in Diagram D it will readily be seen that if a knife or knives which cut on the line $a^3$ $b^3$ were repeatedly and successively used, lines parallel to $a^3$ $b^3$ in all their length would be produced, but by oppositely disposing the curves of my successively-used knives I produce alternately lines $a^3$ $b^3$ and $a^4$ $b^4$, and knives so shaped, located, and used are what I term "oppositely disposed" in their curvature. This manner of cutting I consider an equivalent of that previously described. Simple change in the shape or curvature of the knife produces desired changes in the outline of the projecting flaps. Knives adapted to cut a tube on the lines shown at Nos. 1, 4, 5, and 6 will produce blanks for the envelopes indicated in the adjacent figures and similarly numbered on Sheets 1 and 2 of the drawings; but, as previously stated, changing the locality of the seam and the manner of cutting the blanks from the tube admits of the use of another step in the method—viz., turning each or every other blank in like or opposite directions, as may be desired.

In Diagram D, I have shown the seam in the longitudinal center of the tube, and, as illustrated at No. 2, I may turn each blank, so that what were the edges of the tube are located at the center of the envelope. This brings the seam at the edge of the envelopes, which may be preferred. As before observed, the subsequent folding of each blank is in opposite directions; but each blank may be turned in opposite directions, when the subsequent folding will be in one direction only. As style No. 2, Diagram D, is turned upwardly to the right, Nos. 1, 3, 5, &c., in a series of like styles might be turned upwardly and to the left, when all would be presented back up for subsequent downward folding to close the bottom flaps.

Now, as to the means employed for the practice of my method by machinery: The tube is made by any of the well-known tube mechanisms. The blanks may be turned by the device for that purpose shown in the Wells patent, No. 38,253, of 1863, or by the novel turning-board, which I hereinafter describe. The cutting may be done by means hereinafter shown and described, which is a duplication, rearrangement, location, and timing of similar knives, shown in the Morgan patent, No. 37,726, of 1863; the Pettee patent, No. 38,452, of 1863, and the Armstrong patent, No. 30,191, of 1860, these being applicable by proper adaptation to the slanting cut, and the above Wells patent being in like measure applicable to the direct cut.

Referring to Fig. 1, Sheet 3, A represents a "former," around which a web of paper is formed into a tube in the usual manner. B B represent feed-rolls operating with rolls $b^5$ $b^5$ in the former to feed the tube to the subsequent mechanism. C represents a knife arranged to cut through both plies of the tube in a direction slanted from front to rear in the line of feed, said knife being attached to and rotated by the inclined shaft $C^2$, which is miter-geared to one of the feed-rolls D, as in the above-mentioned Morgan patent. $C'$ is a knife rotated by shaft $C^3$, oppositely inclined and miter-geared to an intermediate gear, which meshes with a third gear upon the other feed-roll D, so that said knife cuts in a direction slanted from rear to front in the line of feed. These knives are timed to succeed each other in the performance of their functions at blank-lengths apart, and when the tube is tightly drawn by the rolls D D they cut the entire width of the tube; but they may be separated a blank-length and timed to cut simultaneously, the blank being held intermediate them by suitable means, and two pairs of similarly-arranged knives, cutting one-half the width of the tube, may be used, each pair working simultaneously. When severed the blank is fed forward upon the table E, the front end of which is a hinged section, and by suitably-timed mechanism operating through rod G is elevated and depressed to deliver said blank to the folding-rolls H or I, the former when the blank is to be folded upwardly and the latter when it is to be folded downwardly. The folding-blade J is adapted to serve both folding-rolls, and takes paste from the fountain K in a manner well known in the art. The tapes L and M deliver the envelopes to subsequent drying and gumming mechanisms, also well known. In this machine the former, if desired, may be oval, diamond, or square in transverse sectional outline; or its upper and lower outlines may be a combination of any of these shapes to assist in producing, with the slanting cut, flaps of desired outline. This is not essential in ordinary styles of envelopes.

At Fig. 2, Sheet 3, is a plan of a part, and at Fig. 3, Sheet 4, an elevation, of modified mechanism for practicing my method.

A is the former, connected by a bar, N, to a turning-board, O, said bar passing through grooves in the feed and cutting rolls B and knives C C, as in the Wells patent, heretofore referred to. The knife C (dotted lines, Fig. 2) is similarly but oppositely curved to knife C', and the roll B is two blanks' length in circumference, so that at each revolution thereof two transverse cuts in oppositely-disposed curved lines are made through both plies of the tube, with the exception of a slight portion at the center of the tube. After being thus partly severed the tube is fed by rolls D along and about the turning-board O. The turning-board is substantially a laterally-curved former, which acts to turn the blank, the projecting curved side o forcing and the receding curved side o' permitting the blank to change its position, so that its center becomes its side, and vice versa. The uncut portion of the tube (now at the edges of the blank) are cut by knives d of suitable shape in rolls D', one at each end thereof. The rolls D' present the blanks to the rotary folding mechanism H I, which is similar to that shown in the Ambrose and Reynolds patent, No. 8,240, of 1851, in which the alternating blades and jaws fold each blank in opposite directions—that is, a blade, h, of roll I operating with a jaw, h', of roll H to fold a blank upwardly, and a succeeding blade h of roll H operating with a succeeding jaw h' of roll I to fold the next blank downwardly—and in each case each of said rolls delivers its blanks to the adjacent pressing-rolls P and P', respectively, the hooks T, resting in the grooves t in each of said rolls, as shown, serving to guide the blanks in a well-known manner. Rolls U take gum from rolls V and apply it to the sealing-flap of the envelopes as they pass into the receiving-troughs X, the upper envelope being deflected by the curved plate W. The troughs X pass through steam-jacketed driers Y, and finally deliver the envelopes upon the tables Z Z, where they may be, by hand or suitable machinery, closed and packed.

At Q, Fig. 2, Sheet 3, I have shown a curved metal plate, which is bent to clasp lightly the receding side o' of the former, and which is supported by an arm, which may be attached to the frame-work of the machine. The function of this plate is to assist in the turning of the blank; but I do not deem it absolutely essential.

I have not shown connecting gearing to operate the several elements of the machinery described, for the reasons that such matters are within the knowledge of any one skilled in the art, and its description in detail is not necessary to a clear understanding of my invention, as it forms no part thereof.

I do not limit myself to the shape of the knives or contour of the cutting-lines herein shown, as they may be changed or combined, as in No. 7, and otherwise, without departing from the spirit of my invention.

Paste may be applied to the bottom flap by pasting-ridges on the folding-rolls H I in a manner long known in the art and not necessary to be described, and hooks T and plate W may be supported on cross-bars resting on the frame of the machine.

I deem it proper to state that the shape of my oppositely-disposed knives may be varied, so that there may be more or less waste—that is, portions of the tube severed therefrom and cast aside, if certain shapes or styles of envelopes are desired—and then, so shaped, may be used in connection with a tubular web to produce said particular shape of envelopes. This I deem as of my invention in that and for the reason that I am the first to cut envelope-blanks from a tube; and I do not therefore limit myself to such cutting when without waste, but may, if desired, cut from a tube with waste.

Having described my invention, what I claim as new, and desire to secure by Letters Patent, is—

1. A step in the art of making envelopes, which consists in severing a tube in or on transverse converging lines, substantially as and for the purpose set forth.

2. That improvement in the art of making envelopes which consists in forming the material into a tube and dividing said tube into blanks having oppositely-disposed outlines, substantially as and for the purpose set forth.

3. That improvement in the art of making envelopes which consists in forming the material into a tube, severing the tube in or on oppositely-disposed lines, and turning the blanks thus formed, substantially as and for the purpose set forth.

4. A method of making envelopes, which comprises the following steps: forming the material into a tube, severing the tube in or on oppositely-disposed lines, turning the tubular blank thus formed, and subsequently folding the same, substantially as shown and described.

5. The combination of a former and duplicated and oppositely-disposed transverse cutting mechanism, located, arranged, timed, and operating substantially as shown and described.

6. The combination of a former, feeding mechanism, transverse oppositely-disposed severing mechanism, and turning mechanism, all substantially as shown and described.

7. A laterally-curved turning-board, substantially as shown and described.

8. The combination of a laterally-curved turning-board and feeding mechanism, substantially as shown and described.

9. The combination of tube-forming mechanism, feeding mechanism, transverse oppositely-disposed severing mechanism, turning mechanism, and folding mechanism comprising oppositely-arranged and co-operating folding devices, all substantially as shown and described.

10. The combination of tube-forming mechanism, folding mechanism arranged and operating to fold in opposite directions, with duplicate drying mechanisms, and with a deflecting-plate intermediate one of said drying mechanisms and said folding mechanism, all substantially as shown and described.

11. The combination of folding mechanism arranged and operating to fold in opposite directions, gumming mechanisms, and duplicate drying mechanisms, and a deflecting-plate arranged intermediate said folding mechanism and one of said drying mechanisms, all substantially as shown and described.

In testimony whereof I have affixed my signature in presence of two witnesses.

EDGAR B. STOCKING.

Witnesses:
H. B. ZEBELY,
E. E. MASSON.